United States Patent Office

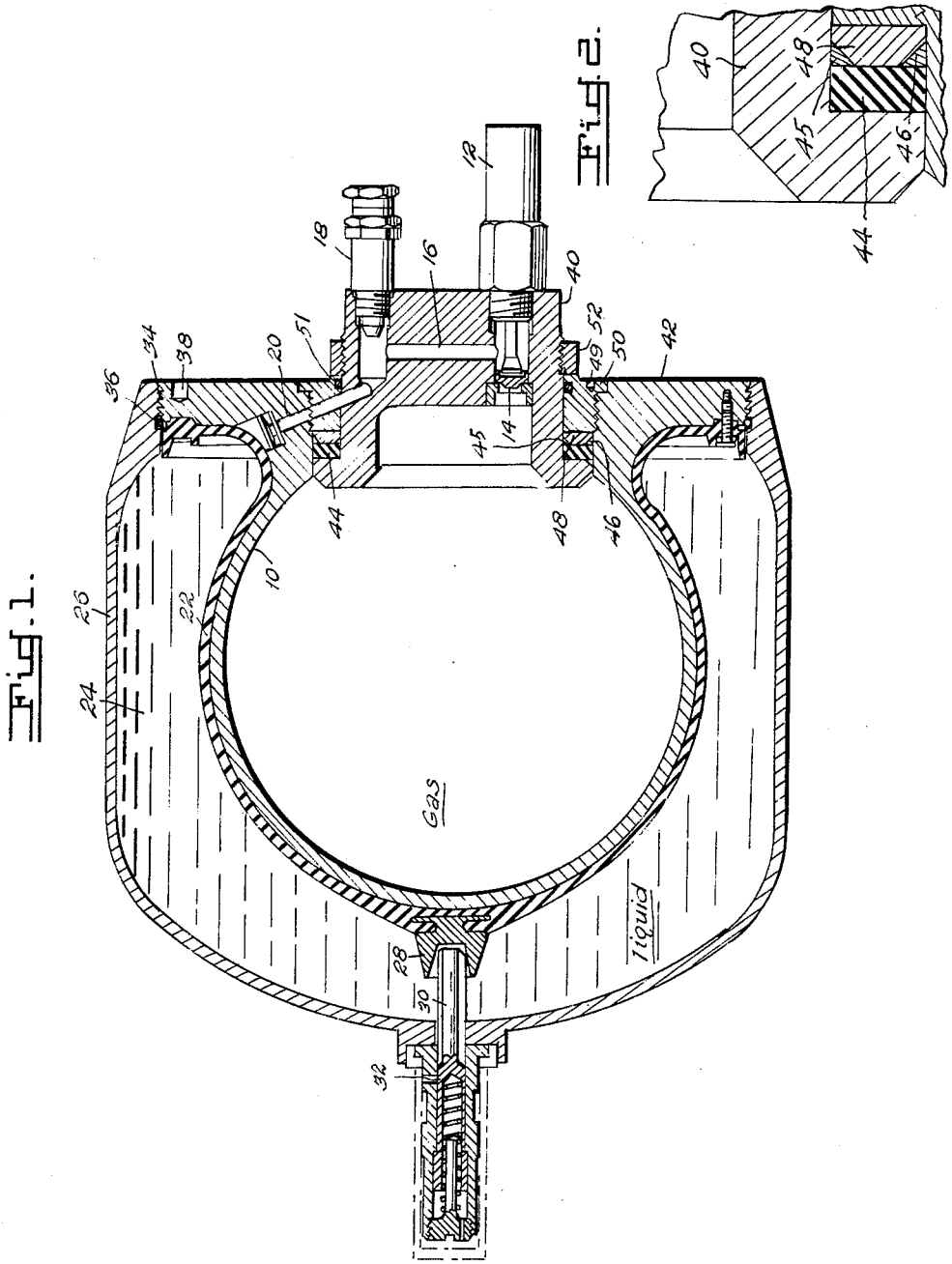

3,208,646
Patented Sept. 28, 1965

3,208,646
HYDROPNEUMATIC ACCUMULATOR
Harold B. Wessenger, Medford, Mass., assignor to the United States of America as represented by the Secretary of the Army
Filed Aug. 17, 1964, Ser. No. 390,247
4 Claims. (Cl. 222—386.5)
(Granted under Title 35, U.S. Code (1952), sec. 266)

The invention described herein may be manufactured and used by or for the Government for governmental purposes, without the payment to me of any royalty thereon.

Guided missiles require power plants to operate their guidance systems. Other types of systems require similar apparatus for storing energy for use at later periods. A very effective power plant for storing energy for a hydraulically operated guidance system can be obtained by a hydropneumatic accumulator as described hereinafter. With such apparatus power may be stored for years, if necessary, to operate the guidance system when the missile is to be fired.

The source of power in a hydropneumatic accumulator is a compressed gas contained in a vessel. In some applications of the accumulator the gas is held under a pressure of several thousand pounds per square inch for long periods of time (several years). To keep the weight of the accumulator within reasonable limits it is necessary that the gas container be made of high strength material and highly stressed.

The gas container of the accumulator must be a closed vessel. The reliability of a highly stressed pressure vessel depends very largely on its surface conditions, particularly the inside surface. A vessel with an inside surface that is free from weld splatter, notches of any kind, tool marks or any irregularities which might be the beginning of a crack should be the objective of the design. The gas container body in this design is machined from a high strength heat treated steel forging. Complete control of the surfaces both inside and out is maintained during manufacture. The cylinder body is open, making inspection of the inner surface possible after machining.

A spherical configuration of the pressure vessel offers the most effective use of material. The opening in the gas container must be closed by employing a packing system that will hold gas at high pressure for very long periods of time and at all temperatures the accumulator may be subjected to without leak.

In the drawing:
FIGURE 1 is a cross section through the device of the invention;
FIGURE 2 is an enlarged detail of FIGURE 1.

An inner container 10 is filled with a compressible gas, such as nitrogen, at very high pressure. An explosive squib 12 releases valve 14 and permits gas from container 10 to flow through passage 16 to pressure regulating valve 18. Thence the gas flows through passage 20 to the inside of elastic bladder 22 and expands same outwardly from around container 10.

The space 24, between bladder 22 and outer casing 26, is filled with oil. Pressure between container 10 and bladder 22 presses outwardly on socket 28 and valve push-rod member 30 to open valve 32. Pressurized oil from space 24 may flow out through valve 32 to various hydraulic motors of the guidance system.

Inner container 10 is screw-threadedly engaged with outer casing 26 at 34 and O-ring seal 36 prevents oil leakage. Spanner wrench prongs may engage sockets 38 for assembly or disassembly of container 10 and casing 26.

The packing system on this accumulator gas container comprises a plug 40 the flange of which is free to slide in body 42. Packing 44 is of a material that will stay pliable for long periods of time when under the pressures and temperatures required for the accumulator service. The beveled rings 45, 46 are of metal and act as an anti-extrusion device for the packing. Beveled rings 45 and 46 are split so as to be expandable as pressure is applied. When the packing is under pressure these rings are forced against the walls of the body and plug and prevent the packing from extruding. Ring 48 is a compression ring which supports two of the anti-extrusion rings and provides a stationary support for the packing. Collar 50 may be screwed into position with a spanner wrench engaging sockets 49. Collar 50 is threaded into the body 42 and takes the thrust of the packing system. Snap ring 51 holds plug 40, collar 50, rings 45, 46, 48 and packing 44 in assembly. Collar 52 preloads the packing before the container is pressurized. When the gas container is filled with gas through a filling valve (not shown in the drawing) the pressure of the gas exerts a force on the plug equal to the area of the outside diameter of the packing flange of the plug times the intensity of pressure of the gas. Since the plug is free to slide in the container body 42 and collar 50 this force causes an intensity of pressure in the packing greater than that in the gas due to the smaller area of the packing. Gas is retained in this container without leak because the intensity of pressure in the packing is always greater than that in the gas.

The apparatus described provides very effective power storage means which can be charged with high pressure gas and the stored power held for release when needed, even years later.

I claim:
1. A hydropneumatic accumulator comprising: an outer liquid container with an outlet valve; an inner gas container; a flexible bladder, having a peripheral edge, snugly encompassing said inner gas container and sealingly connected thereto around said peripheral edge; valve means for releasing gas from said inner container and means to actuate said valve means; passage means from said valve means to the inside of said flexible bladder; apparatus connected between said flexible bladder and said first-mentioned outlet valve to open said outlet valve as said bladder is expanded; the apparatus operating such that high pressure gas from said inner gas container may be released through said valve means and passage means to pressurize and expand said flexible bladder to thereby place said liquid under pressure and open said outlet valve to release the pressurized liquid; and a pressure relief valve communicating with said passage means to relieve excessive pressures in said passage to thereby prevent excessive pressure buildup in said flexible bladder or in said liquid container.

2. A hydropneumatic accumulator comprising: an outer liquid container with an outlet valve; an inner gas container; a flexible bladder, having a preipheral edge, snugly encompassing said inner gas container and sealingly connected thereto around said peripheral edge; valve means for releasing gas from said inner container and means to actuate said valve means; passage means from said valve means to the inside of said flexible bladder; apparatus connected between said flexible bladder and said first-mentioned outlet valve to open said outlet valve as said bladder is expanded; the apparatus operating such that high pressure gas from said inner gas container may be released through said valve means and passage means to pressurize and expand said flexible bladder to thereby place said liquid under pressure and open said outlet valve to release the pressurized liquid; and sealing means for said inner gas container comprising a plug member with a flange to slide freely into an opening in said gas container; a collar threadedly engaging said opening; a three-part anti-extrusion ring assembly of beveled rings; and a packing ring between said anti-extrusion ring assembly and said flange.

3. A hydropneumatic accumulator as in claim 2 and a snap ring to hold the collar and associated parts in assembled relationship, and a second collar threadedly engaging said plug member and bearing against the first-mentioned collar to preload the anti-extrusion ring assembly and packing ring prior to final heavy loading of these parts by tightening the first-mentioned collar in the threaded opening in said gas container.

4. A hydropneumatic accumulator comprising: an outer liquid container with an outlet valve; an inner gas container having an inner surface which is machined and polished to remove any traces of weld or tool marks to thereby minimize the likelihood of cracking or splitting of the container while under high pressures for long periods of time; a flexible bladder, having a peripheral edge, snugly encompassing said inner gas container and sealingly connected thereto around said peripheral edge; valve means for releasing gas from said inner container and means to actuate said valve means; passage means from said valve means to the inside of said flexible bladder; and apparatus connected between said flexible bladder and said first-mentioned outlet valve to open said outlet valve as said bladder is expanded; the apparatus operating such that high pressure gas from said inner gas container may be released through said valve means and passage means to pressurize and expand said flexible bladder to thereby place said liquid under pressure and open said outlet valve to release the pressurized liquid.

References Cited by the Examiner

UNITED STATES PATENTS

| | | | |
|---|---|---|---|
| 2,342,356 | 2/44 | Mercier | 138—30 |
| 3,000,542 | 9/61 | Longenecker et al. | 222—389 X |

LOUIS J. DEMBO, *Primary Examiner.*